3,177,222
3-ARALKYL-4-THIAZOLIDONE-2-CARBOXYLIC AND -2-ALKANOIC ACIDS, AND DERIVATIVES THEREOF
Alexander R. Surrey, Albany, N.Y., assignor to Sterling Drug Inc., New York, N.Y., a corporation of Delaware
No Drawing. Filed Feb. 12, 1963, Ser. No. 257,832
8 Claims. (Cl. 260—306.7)

This invention relates to 3-aralkyl-4-thiazolidone-2-carboxylic and -2-alkanoic acids, and derivatives thereof.
The compounds of my invention have the Formula I

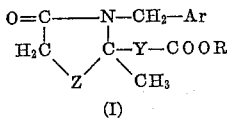

(I)

where Ar is monocarbocyclic-aryl having six ring carbon atoms, Y is a direct linkage or lower-alkylene, R is hydrogen or lower-alkyl, and Z is

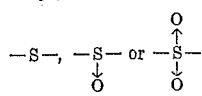

The term "lower-alkylene," as used herein and designated as Y in Formula I, means alkylene radicals having from one to six carbon atoms and is illustrated by

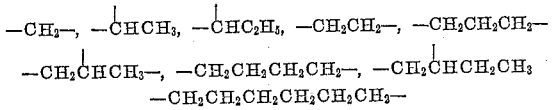

and the like.

The term "monocarbocyclic-aryl having six ring carbon atoms," as used herein and designated as Ar in Formula I, means aryl radicals of the benzene series, as illustrated by the unsubstituted phenyl radical and phenyl radicals substituted by low-molecular weight substituents such as —R', —OR', —S—R',

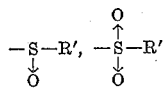

—NHR', —N(R')$_2$, —NHCOR', -halo, —CF$_3$, —NO$_2$, —NH$_2$ and —OH where R' is lower-alkyl or phenyl. The substituted phenyl radicals have preferably from one to three substituents which can be in any of the available positions of the phenyl nucleus, and where more than one substituent is present, they can be the same or different and they can be in any of the various position combinations relative to each other. The halo substituents include chloro, bromo, iodo and fluoro.

The term "lower-alkyl," as used herein, e.g., as one of the meanings for R in Formula I or for R' above, means alkyl radicals having from one to six carbon atoms and is illustrated by methyl, ethyl, n-propyl, isopropyl, n-butyl, 2-butyl, isobutyl, n-amyl, isoamyl, n-hexyl, 3-hexyl, and the like.

The compounds of Formula I where Z is S are prepared by reacting an azomethine of the Formula II, Ar—CH$_2$—N=C(CH$_3$)—Y—COOR, where Ar, Y and R have the same meanings designated above, with thioglycolic acid under a variety of conditions, with or without a solvent. A preferred procedure is to carry out the reaction in refluxing benzene with a continuous separator connected to the apparatus (see illustrations on pages 262 and 422, Organic Syntheses, collective volume I, 2nd ed., N.Y., 1941) to remove the water formed by the reaction. The formation of the thiazolidone ring probably takes place in two steps as follows: additions of the thioglycolic acid to the double bond of the azomethine to form the compound of the Formula III

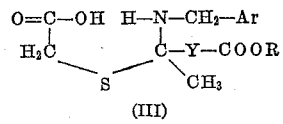

(III)

and then ring closure of III by splitting out of water. Since the intermediate azomethine (II) is formed by reacting a keto acid or ester, CH$_3$COYCOOR, with an amine, Ar—CH$_2$—NH$_2$, with the splitting out of water, this preparation is also conveniently run in the same reaction vessel using the same solvent, thus making isolation of the azomethine unnecessary. The thioglycolic acid is added to the solution of azomethine after no further water is formed by the reaction of the ketone with amine. Heating is then continued until no more water is collected, thereby indicating completion of the cyclization to form the thiazolidone ring. Illustrative of this procedure is the reaction of thioglycolic acid with the azomethine formed by reacting ethyl acetoacetate with 2-methoxybenzylamine to yield ethyl 3-(2-methoxybenzyl)-2-methyl-4-thiazolidone-2-acetate.

The above procedure, while preferred, can be modified, for example, it can be run without a solvent or using other solvents, e.g., toluene, ethanol, isopropyl alcohol, n-hexane, or it can be run at temperatures as low as about 50° C. or as high as 150° C. or greater, with the lower temperatures requiring a longer time for completion of the reaction. Another modification is to heat a mixture of a keto acid or ester of the formula CH$_3$COYCOOR, an amine of the formula Ar—CH$_2$—NH$_2$ and thioglycolic acid, where Ar, Y and R have the meanings given hereinabove; the azomethine (Ar—CH$_2$—N=C(CH$_3$)—Y—COOR)

first forms and then reacts with the thioglycolic acid as shown above.

The 3-aralkyl-2,2-disubstituted-4-thiazolidones-1-oxides having Formula I where Z is SO are prepared by oxidizing the corresponding 3-aralkyl-2,2-disubstituted-4-thiazolidones. This oxidation is carried out by reacting the 4-thiazolidone with an oxidizing agent effective to oxidize sulfides to sulfoxides. Various oxidative procedures can be employed but the one preferred in practicing my invention comprises using a per-organic acid, e.g., peracetic acid, in a suitable solvent, e.g., ethyl acetate. The reaction is exothermic and is carried out preferably by mixing the reactants at a low temperature, i.e., from 0° C. to 10° C. Other oxidizing agents that can be used are other per-organic acids, e.g., perbenzoic acid.

The 3-aralkyl-2,2-disubstituted-4-thiazolidone-1,1-dioxides of my invention (Formula I where Z is SO$_2$) are prepared preferably by oxidizing the corresponding 3-aralkyl-2,2-disubstituted-4-thiazolidones (Formula I where Z is S). This oxidation is carried out by reacting the 4-thiazolidone with an oxidizing agent effective to oxidize sulfides to sulfones. Various oxidative procedures can be employed, but the one preferred in practicing my invention comprises using potassium permanganate in aqueous acetic acid solution. Other oxidizing agents that can be used include hydrogen peroxide, chromium trioxide (CrO$_3$), and the like. Also, the oxidation can be carried out using an excess of perorganic acid, e.g., peracetic acid, at about room temperature (20–25° C.) for several days. Alternatively, the 3-aralkyl-2,2-disubstituted-4-thiazolidone-1,1-dioxides can be prepared by oxidizing the corresponding 1-oxides (Formula I where Z is SO), using these same oxidizing agents effective to oxidize sulfides to sulfones, e.g., potassium permanganate, hydrogen peroxide, etc.

The chemical structures of my 3-aralkyl-2,2-disubstituted-4-thiazolidones and corresponding -1-oxides and -1,1-dioxides are established by the mode of their syntheses and corroborated by the correspondence of calculated and found values for the elementary analyses for representative examples.

The compounds of my invention have been tested by standard bacteriological and biochemical evaluation procedures and found to possess antibacterial and antimetabolite properties, for example, having bacteriostatic activity in vitro against *Staphylococcus aureus* and *Eberthella typhi*, and being active to inhibit the growth of ribose synthesis in vitro.

The following examples will further illustrate specific embodiments of the invention without, however, limiting it thereto.

EXAMPLE 1

3-benzyl-2-carbomethoxy-2-methyl-4-thiazolidone was prepared as follows: A mixture of 10.2 g. of methyl pyruvate, 10.7 g. of benzylamine, 10.1 g. of thioglycolic acid and 100 cc. of benzene was refluxed with a continuous separator connected to the reaction vessel for removal of water formed by the reaction. After three hours, 3.6 cc. of water had been collected. The reaction mixture was cooled and washed successively with 5% aqueous sodium hydroxide solution, water, 2 N aqueous hydrochloric acid solution and water. The benzene solution was dried over anhydrous sodium sulfate, the mixture filtered, and the filtrate evaporated to remove the benzene, thereby yielding 20 g. of a yellow oily material. A small portion of the yellow oil was triturated with n-pentane to yield a solid which was added to the rest of the oily material which solidified. The solid was recrystallized from isopropyl alcohol to yield 4.5 g. of the product, 3-benzyl-2-carbomethoxy-2-methyl-4-thiazolidone, M.P. 82.4–85.6° C. (corr.).

EXAMPLE 2

3-benzyl-2-carboxy-2-methyl-4-thiazolidone was prepared by hydrolyzing the corresponding methy ester as follows: The methyl ester was prepared following the procedure described in Example 1 using 20.4 g. of methyl pyruvate, 21.4 g. of benzylamine, 20.2 g. of thioglycolic acid, 200 cc. of benzene, and a reflux period of ninety minutes. There was thus obtained 37 g. of (70%) of the methyl ester as a yellow oil. A mixture of this oil and 200 cc. of 5% aqueous potassium hydroxide solution was refluxed for three hours. The hot reaction mixture was treated with decolorizing charcoal and the mixture filtered through infusorial earth. The filtrate was washed with benzene, made acidic with an excess of concentrated hydrochloric acid, and extracted with chloroform. The chloroform solution was dried over anhydrous calcium sulfate. When a solid started to separate during the drying step, the mixture was filtered quickly and the calcium sulfate washed with ethanol. The ethanol washings were combined with the chloroform solution and the combination evaporated in vacuo to yield a solid which was crystallized once from ethylene dichloride and once from isopropyl alcohol to yield 7 g. of the product, 3-benzyl-2-carboxy-2-methyl-4-thiazolidone, M.P. 177.6–179.8° C. (corr.).

EXAMPLE 3

Ethyl 3-benzyl-2-methyl-4-thiazolidone-2-acetate was prepared as follows: A mixture containing 26.0 g. of ethyl acetoacetate, 21.4 g. of benzylamine and 200 cc. of benzene was refluxed with a continuous separator connected to the reaction vessel. After ninety minutes, 3.2 cc. of water had been collected. To the reaction mixture was added 20.2 g. of thioglycolic acid and the mixture was refluxed for fifty-six hours, after which time 7.0 cc. of water had been collected. The reaction mixture was then allowed to stand overnight at room temperature, washed twice with 2 N hydrochloric acid and once with water, dried over anhydrous sodium sulfate, evaporated in vacuo to remove the benzene, and distilled to yield 37 g. (61%) of the product, ethyl 3-benzyl-2-methyl-4-thiazolidone-2-acetate, distilling at 147–151° C. at 0.003 mm.

EXAMPLE 4

3-benzyl-2-methyl-4-thiazolidone-2-acetic acid was prepared by hydrolyzing the corresponding ethyl ester as follows: A mixture containing 14.6 g. of ethyl 3-benzyl-2-methyl-4-thiazolidone-2-acetate and 100 cc. of 10% aqueous potassium hydroxide solution was refluxed for two hours. The reaction mixture was washed with chloroform, made acidic with an excess of 6 N hydrochloric acid and extracted with chloroform. The chloroform was dried over anhydrous sodium sulfate and the filtrate evaporated in vacuo to yield 15 g. of oily material which was allowed to stand at room temperature over the weekend. After this time, most of the oil had crystallized. The remaining oil was decanted off and the solid was recrystallized from benzene, using decolorizing charcoal, to yield 5 g. of the product, 3-benzyl-2-methyl-4-thiazolidone-2-acetic acid, M.P. 99.9–103.0° C. (corr.).

EXAMPLE 5

Ethyl 3-(4-chlorobenzyl)-2-methyl-4-thiazolidone-2-acetate was prepared as follows: A mixture containing 26 g. of ethyl acetoacetate, 28.3 g. of 4-chlorobenzylamine, 20.2 g. of thioglycolic acid and 200 cc. of benzene was refluxed with a continuous separator connected to the reaction vessel for removal of water. After seventy-two hours, 7.8 cc. of water had been collected. The reaction mixture was washed successively with water, 2 N hydrochloric acid and water; dried over anhydrous sodium sulfate; and, evaporated in vacuo to remove the benzene, thereby yielding 57 g. of a red oily material. The oil was distilled in vacuo to yield a 36 g. fraction distilling at 175° C. at 0.005 mm. This fraction was redistilled to yield 30 g. of a yellow-orange oil distilling at 152–157° C. at 0.001 mm. Some of the oil solidified and the mixture was crystallized from benzene-n-pentane to yield 17 g. of the product, ethyl-3-(4-chlorobenzyl)-2-methyl-4-thiazolidone-2-acetate, M.P. 69.5–71° C. For analysis, a sample was recrystallized twice from isopropyl alcohol and found to melt at 69.0–70.2° C. (corr.).

EXAMPLE 6

3-(4-chlorobenzyl)-2-methyl-4-thiazolidone-2-acetic acid was prepared following the procedure described in Example 4 using 11.5 g. of ethyl 3-(4-chlorobenzyl)-2-methyl-4-thiazolidone-2-acetate, 50 cc. of 5% aqueous potassium hydroxide solution, and a reflux period of two hours. The product melted at 134.2–137.0° C. (corr.) when recrystallized from benzene using decolorizing charcoal.

EXAMPLE 7

3-benzyl-2-methyl-4-thiazolidone-2-propionic acid was prepared as follows: A mixture containing 23.2 g. of levulinic acid, 21.4 g. of benzylamine, 20.2 g. of thioglycolic acid and 200 cc. of benzene was refluxed for thirty-two hours with a continuous separator connected to the reaction vessel for removal of water. After this heating period, 7.2 cc. of water had been collected. The reaction mixture was washed with water and then 2 N hydrochloric acid, and extracted with 2% aqueous sodium hydroxide solution. The alkaline extract was washed with ethylene dichloride and made acidic with an excess of hydrochloric acid. The mixture was extracted with ethylene dichloride and the extract was washed with water, dried over anhydrous sodium sulfate and evaporated in vacuo to yield 47 g. of an oily material. A small portion of the oil was solidified by triturating with n-pentane. The remainder of the oil was dissolved in 100 cc. of benzene, the solution seeded with the solid material, and the mixture cooled in an ice bath. The solid was collected and air-dried to yield 28 g. of the product, 3-benzyl-2-methyl-4-thiazolidone-2-propionic acid, M.P. 104–107° C. A sample recrystallized from benzene melted at 103.1–106.3° C. (corr.).

EXAMPLE 8

Ethyl 3 - benzyl - 2 - methyl - 4 - thiazolidone - 2 - propionate is obtained following the procedure described in Example 1 using a corresponding molar equivalent quantity of ethyl levulinate in place of methyl pyruvate.

Following the procedures described in Examples 1, 3 or 5 and using corresponding molar equivalent quantities of the appropriate reactants, the compounds of Table I can be prepared.

*Table I*

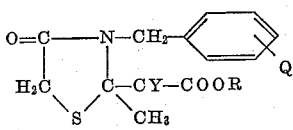

| Example | Q | Y | R |
|---------|---|---|---|
| 9 | H | (CH$_2$)$_6$ | C$_2$H$_5$ |
| 10 | 2-OCH$_3$ | CH$_2$ | n-C$_4$H$_9$ |
| 11 | 3-SC$_2$H$_5$ | (CH$_2$)$_3$ | n-C$_6$H$_{13}$ |
| 12 | 4-NHC$_4$H$_9$-n | CH$_2$CH(CH$_2$) | i-C$_3$H$_7$ |
| 13 | 4-N(CH$_3$)$_2$ | CH$_2$ | C$_2$H$_5$ |
| 14 | 3-4,5-(OCH$_3$)$_3$ | CH$_2$ | C$_2$H$_5$ |
| 15 | 2,4,6-Cl$_3$ | CH$_2$CH$_2$ | CH$_3$ |
| 16 | 4-S(O)-CH$_3$ | CH$_2$ | C$_2$H$_5$ |
| 17 | 3-S(O)(O)-C$_2$H$_5$ | CH$_2$ | CH$_3$ |
| 18 | 4-C$_6$H$_{13}$-n | | CH$_3$ |
| 19 | 4-phenyl | CH$_2$ | C$_2$H$_5$ |
| 20 | 3-NHCOCH$_3$ | CH$_2$ | C$_2$H$_5$ |
| 21 | 4-NHCOC$_2$H$_5$ | CH$_2$CH$_2$ | C$_2$H$_5$ |
| 22 | 3-NH-C(O)-phenyl | | C$_2$H$_5$ |
| 23 | 2-Br | (CH$_2$)$_4$ | C$_2$H$_5$ |
| 24 | 3-CF$_3$ | CH$_2$ | C$_2$H$_5$ |
| 25 | 4-NO$_2$ | CH$_2$ | C$_2$H$_5$ |
| 26 | 4-NH$_2$ | CH$_2$CH$_2$ | C$_2$H$_5$ |
| 27 | 3-OH | CH$_2$ | C$_2$H$_5$ |
| 28 | 2-C$_2$H$_5$ | CH$_2$ | CH$_3$ |
| 29 | 2,4-(CH$_3$)$_2$ | CH$_2$ | CH$_3$ |
| 30 | 4-OC$_4$H$_9$-n | | n-C$_3$H$_7$ |
| 31 | 3-SC$_5$H$_{11}$-n | CH$_2$ | C$_2$H$_5$ |
| 32 | 2,4-I$_2$ | CH$_2$CH$_2$ | C$_2$H$_5$ |
| 33 | 3-O-phenyl | CH$_2$ | C$_2$H$_5$ |
| 34 | 4-S-phenyl | CH$_2$CH$_2$ | C$_2$H$_5$ |
| 35 | 4-S(O)-phenyl | CH$_2$ | C$_2$H$_5$ |
| 36 | 4-S(O)(O)-phenyl | CH$_2$ | CH$_3$ |
| 37 | 3-NH-phenyl | CH$_2$ | C$_2$H$_5$ |
| 38 | 4-N(phenyl)$_2$ | CH$_2$ | C$_2$H$_5$ |

All of the esters of Table I can be hydrolyzed to form the corresponding acids (R=H) by following the procedure described in Example 2 using molar equivalent quantities of the ester and potassium hydroxide.

EXAMPLE 39

3 - benzyl - 2 - carbomethoxy - 2 - methyl - 4 - thiazolidone-1-oxide can be obtained as follows. To a chilled solution (about 5° C.) of 11.3 g. of 3-benzyl-2-carbomethoxy-2-methyl-4-thiazolidone dissolved in 80 cc. of benzene is added dropwise with stirring over a period of about thirty minutes a solution containing 9.0 g. of 40% peracetic acid dissolved in 80 cc. of ethyl acetate. The reaction mixture is stirred for an additional thirty minutes; washed twice with aqueous sodium bisulfite solution and twice with water; dried over anhydrous calcium sulfate; and, evaporated in vacuo to yield the oxide.

Following the above procedure using molar equivalent quantities of the other foregoing 4-thiazolidones (Examples 2–38), the corresponding 1-oxides can be obtained, e.g., 3-benzyl-2-(2-carboxyethyl)-2-methyl-4-thiazolidone-1-oxide is obtained from the corresponding 3-benzyl-2-methyl-4-thiazolidone-2-propionic acid of Example 7.

EXAMPLE 40

3 - benzyl - 2 - (carbethoxymethyl) - 2 - methyl - 4 - thiazolidone-1,1-dioxide can be prepared as follows: To a stirred solution containing 10 g. of ethyl 3-benzyl-2-methyl-4-thiazolidone-2-acetate dissolved in 40 cc. of acetic acid and kept at about 20–25° C. is added dropwise a solution containing 10 g. of potassium permanganate in 100 cc. of water. The reaction mixture is decolorized by adding an aqueous solution of sodium bisulfite. The precipitate is extracted with chloroform and the extract heated in vacuo to remove the chloroform and yield the 1,1-dioxide.

Following the above procedure and using corresponding molar equivalent quantities of the 4-thiazolidones of Examples 1, 2 and 4–38, the corresponding 1,1-dioxides can be prepared, e.g., 3-benzyl-2-carboxy-2-methyl-4-thiazolidone-1,1-dioxide is obtained from the corresponding 3 - benzyl - 2 - carboxy - 2 - methyl - 4 - thiazolidone of Example 2.

I claim:
1. A compound of the formula

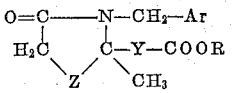

where Ar is a member of the group consisting of phenyl, and phenyl substituted by from one to three members of the group consisting of —R', —OR', —S—R'

$$-S-R', \quad -\overset{O}{\underset{\downarrow}{S}}-R'$$

$$-\overset{O}{\underset{\downarrow}{\overset{\uparrow}{S}}}-R', \quad -\overset{O}{\underset{\downarrow}{\overset{\uparrow}{S}}}-R'$$

—NHR', —N(R')$_2$, —NHCOR', halo, —CF$_3$, —NO$_2$, —NH$_2$ and —OH where R' is a member of the group consisting of lower-alkyl and phenyl, Y is a member selected from the group consisting of a direct linkage and lower-alkylene, R is a member selected from the group consisting of hydrogen and lower-alkyl, and Z is a member selected from the group consisting of $$-S-, \quad -\overset{}{\underset{\downarrow}{S}}- \quad \text{and} \quad -\overset{O}{\underset{\downarrow}{\overset{\uparrow}{S}}}-$$

2. 3-benzyl-2-carbomethoxy-2-methyl-4-thiazolidone.
3. 3-benzyl-2-carboxy-2-methyl-4-thiazolidone.
4. Ethyl 3-benzyl-2-methyl-4-thiazolidone-2-acetate.
5. 3-benzyl-2-methyl-4-thiazolidone-2-acetic acid.
6. Ethyl 3-(4-chlorobenzyl)-2-methyl-4-thiazolidone-2-acetate.
7. 3-(4-chlorobenzyl)-2-methyl-4-thiazolidone-2-acetic acid.
8. 3-benzyl-2-methyl-4-thiazolidone-2-propionic acid.

References Cited in the file of this patent

Chemical Abstracts, vol. 39, pages 5956 and 5963 (1945).

Hackh's Chemical Dictionary, (Philadelphia, 1944), pages 78 and 110.